US008179397B2

(12) United States Patent
Yoshitake et al.

(10) Patent No.: US 8,179,397 B2

(45) Date of Patent: May 15, 2012

(54) SCREEN DISPLAY CONTROL DEVICE

(75) Inventors: Michio Yoshitake, Fukuoka (JP); Kazuya Takita, Kitakyusyu (JP)

(73) Assignee: Seiko Epson Corporation, Tokyo (JP)

( * ) Notice: Subject to any disclaimer, the term of this patent is extended or adjusted under 35 U.S.C. 154(b) by 623 days.

(21) Appl. No.: 12/322,805

(22) Filed: Feb. 6, 2009

(65) Prior Publication Data

US 2009/0262123 A1 Oct. 22, 2009

(30) Foreign Application Priority Data

Feb. 7, 2008 (JP) ................................ 2008-027263
Jun. 2, 2008 (JP) ................................ 2008-144246

(51) Int. Cl.
*G09G 5/39* (2006.01)
*G09G 5/36* (2006.01)
*G06T 9/00* (2006.01)

(52) U.S. Cl. ......................... 345/531; 345/555; 345/560

(58) Field of Classification Search .................. 345/531, 345/572, 574
See application file for complete search history.

(56) References Cited

U.S. PATENT DOCUMENTS 5,912,671 A * 6/1999 Oka .............................. 345/427
6,538,675 B2 3/2003 Aratani et al.
7,248,299 B2 * 7/2007 Shioji ...................... 348/333.02
2002/0030686 A1 * 3/2002 Sakai et al. .................. 345/531
2007/0273701 A1 * 11/2007 Mizukoshi et al. .......... 345/531
2008/0303838 A1 12/2008 Funakubo
2009/0115790 A1 * 5/2009 Tani et al. .................... 345/531
2009/0262123 A1 10/2009 Yoshitake et al.

FOREIGN PATENT DOCUMENTS

JP 2007-264572 10/2007

OTHER PUBLICATIONS

U.S. Appl. No. 12/322,812—Non-Final Office Action dated Sep. 14, 2011.

* cited by examiner

*Primary Examiner* — Kee M Tung
*Assistant Examiner* — Leon T Cain, II
(74) *Attorney, Agent, or Firm* — Nutter McClennen & Fish LLP; Michael P. Visconti, III; John J. Penny, Jr.

(57) ABSTRACT

A screen display control device includes: a compression unit which compresses input image data in a line unit; a rewritable image memory to which the compressed data compressed in the line unit by the compression unit is written in non-synchronization with a reading process; a decompression unit which decompresses the compressed data periodically read from the image memory in synchronization with screen display to restore original image data; a display unit which displays an image of the image data decompressed and restored by the decompression unit; a buffer memory which temporarily maintains one-line data of the image data; and a writing/reading control unit which controls the process of writing the compressed data to the image memory and the processes of writing and reading the image data to and from the buffer memory.

5 Claims, 13 Drawing Sheets

FIG. 6

| | STATE A | STATE B |
|---|---|---|
| | WRITING PROHIBITION PERIOD IS WITHIN BACK PORCH OF LINE | WRITING PROHIBITION PERIOD IS WITHIN FRONT PORCH OF FRONT LINE |
| BACK PORCH PERIOD HBP | READING LINE = WRITING LINE<br>READING PIXEL COUNTER VALUE > BP PROHIBITION PIXEL COUNTER VALUE | |
| ACTIVE AREA PERIOD HACT | READING LINE = WRITING LINE<br>READING PIXEL COUNTER VALUE < WRITING PIXEL COUNTER VALUE | |
| FRONT PORCH PERIOD HFP | NO PROHIBITION PERIOD | READING LINE + 1 = WRITING LINE<br>READING PIXEL COUNTER VALUE ><br>FP PROHIBITION PIXEL COUNTER VALUE |

SCREEN DISPLAY CONTROL DEVICE

BACKGROUND

1. Technical Field

The present invention relates to a technique capable of controlling screen display.

2. Related Art

In the past, a screen display control device having a function of processing image data, which is disclosed in JP-A-2007-264572 (paragraphs 0017 and 0018, FIG. 1, etc.), for example, was known. The screen display control device generally includes an image memory (video RAM) temporarily storing the processed image data and performs screen display by periodically reading the processed image data stored in the image memory. In recent years, however, a screen display apparatus such as a liquid crystal display, a plasma display, or an organic EL display has a capability to realize high definition and high gray scale, thereby increasing a volume of image data to be displayed in the screen display apparatus. Therefore, the image memory storing the increased volume of image data needs to have a large capacity, thereby causing an increase in manufacture cost. As a method of solving this problem, a technique capable of compressing the image data by a known data compression method such as a predictive encoding (DPCM encoding) method of encoding differences of adjacent pixel data and storing the compressed data in the image memory was suggested. In addition, upon performing screen display, original image data is restored by reading the compressed data from the image memory and decompressing the compressed data.

However, for example, when the image data are compressed in a line unit and the compressed data are stored in the image memory, processes of writing and reading the compressed data to and from the image memory in a line unit are performed. Since the processes of writing and reading the compressed data are performed asynchronously, a line of the compressed data to be written to the image memory and a line of the compressed data to be read from the image memory are the same in some cases. When the process of writing the compressed data to the image memory and the process of reading the compressed data from the image memory are performed on the same line, the following problems may occur. That is, the process of writing newly compressed data is performed ahead during the process of reading the compressed data stored in the image memory, or the process of reading the compressed data is performed ahead during the process of writing newly compressed data to the image memory. The image data are compressed using the differences of the adjacent data, as described above. Therefore, when the writing process is performed ahead or the reading process is performed ahead, the image data are not able to be restored after the above problem occurs even in the process of reading the compressed data. In order to solve this problem, there is a known a technique in which the newly compressed data to be written are temporarily maintained in a buffer memory and the newly compressed data maintained in the buffer memory are written to the image memory after the process of reading the compressed data from the image memory is completed, when the process of writing the compressed data to the image memory and the process of reading the compressed data from the image memory are performed on the same line. However, this technique has a problem since efficiency is poor in that the newly compressed data are not able to be written to the image memory until the process of reading the already compressed data from the image memory is completed after maintaining the newly compressed data in the buffer memory. Therefore, an improved technique is necessary.

SUMMARY

An advantage of some aspects of the invention is that it provides a technique capable of efficiently writing compressed data to an image memory.

According to an aspect of the invention, there is provided a screen display control device including: a compression unit which compresses input image data in a line unit; a rewritable image memory to which the compressed data compressed in the line unit by the compression unit is written in non-synchronization with a reading process; a decompression unit which decompresses the compressed data periodically read from the image memory in synchronization with screen display to restore original image data; a display unit which displays an image of the image data decompressed and restored by the decompression unit; a buffer memory which temporarily maintains one-line data of the image data; and a writing/reading control unit which controls the process of writing the compressed data to the image memory and the processes of writing and reading the image data to and from the buffer memory. When the processes of reading and writing the compressed data of the same line to and from the image memory compete with each other, the writing/reading control unit controls the image data of the line to be written so as to be maintained in the buffer memory. In addition, the writing/reading control unit controls the compressed data of the line formed by allowing the compression unit to compress the image data maintained in the buffer memory so as to be written to a vacant area of a pixel unit generated in the image memory in a pixel unit in response to the process of reading the compressed data of the line.

In the screen display control device according to this aspect of the invention, when the processes of writing and reading the compressed data of the same line to the image memory compete with each other, the writing/reading control unit performs controls the image data of the line to be written so as to be maintained in the buffer memory and controls the process of writing the compressed data of the line formed by allowing the compression unit to compress the image data maintained in the buffer memory so as to be written to the vacant area of a pixel unit generated in the image memory in a pixel unit in response to the process of reading the compressed data of the line. Accordingly, since the process of writing newly compressed data to the vacant area generated in the image memory in a pixel unit without waiting end of the process of reading the compressed data of the line where the competition between the writing and reading processes from the image memory, it is possible to effectively write the compressed data to the image memory.

In the screen display control device, the buffer memory may be a line buffer memory which is provided in front of the compression unit to maintain the image data. With such a configuration, since a practical configuration of the buffer memory is realizable, it is possible to allow the writing/reading control unit to easily control the processes of writing and reading the image data to and from the buffer memory.

According to another aspect of the invention, there is provided a screen display control device including: a compression unit which compresses input image data in a line unit; a rewritable image memory to which the compressed data compressed in the line unit by the compression unit is written in non-synchronization with a reading process; a decompression unit which decompresses the compressed data periodically read from the image memory in synchronization with screen display to restore original image data; a display unit which displays an image of the image data decompressed and restored by the decompression unit; a buffer memory which temporarily maintains one-line data of the compressed data; and a writing/reading control unit which controls the process of writing the compressed data to the image memory and processes of writing and reading the image data to and from the buffer memory. When the processes of reading and writing the compressed data of the same line to and from the image memory compete with each other, the writing/reading control unit controls the compressed data of the line to be written so as to be maintained in the buffer memory. In addition, the writing/reading control unit controls the compressed data of the line maintained in the buffer memory so as to be written to a vacant area of a pixel unit generated in the image memory in a pixel unit in response to the process of reading the compressed data of the line.

In the screen display control device according to this aspect of the invention, when the processes of writing and reading the compressed data of the same line to and from the image memory compete with each other, the writing/reading control unit performs controls the image data of the line to be written so as to be maintained in the buffer memory and controls the process of writing the compressed data maintained in the buffer memory so as to be written to the vacant area of a pixel unit generated in the image memory in a pixel unit in response to the process of reading the compressed data of the line. Accordingly, since the process of writing newly compressed data to the vacant area generated in the image memory in a pixel unit without waiting end of the process of reading the compressed data of the line where the competition between the writing and reading processes from the image memory, it is possible to effectively write the compressed data to the image memory.

BRIEF DESCRIPTION OF THE DRAWINGS

The invention will be described with reference to the accompanying drawings, wherein like numbers reference like elements.

FIG. 6 is a diagram illustrating an example of writing prohibition determination.

DESCRIPTION OF EXEMPLARY EMBODIMENTS

Figure 1:
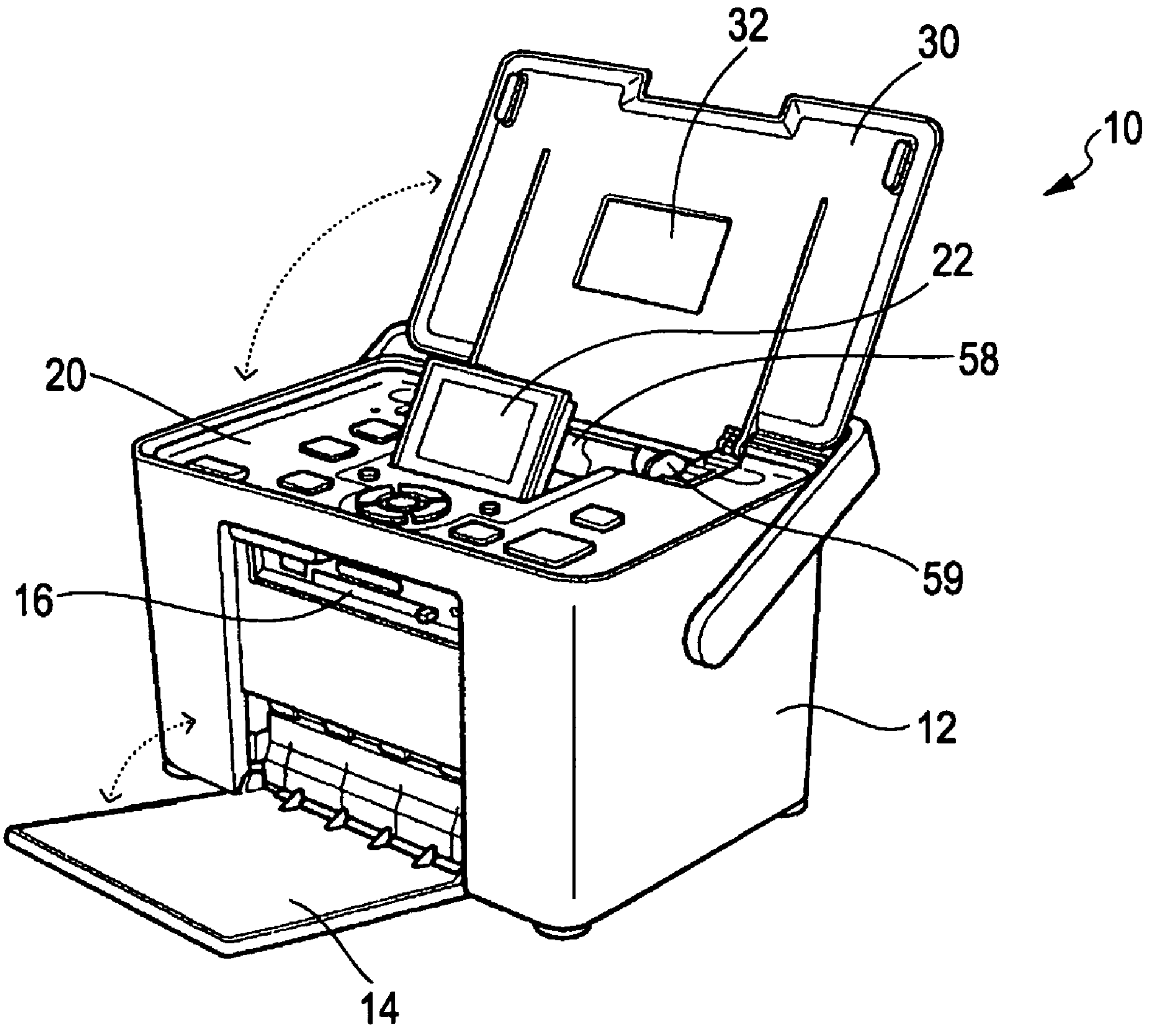
FIG. 1 is a perspective view illustrating a photo printer equipped with a screen display control device according to the invention.
Figure 2:
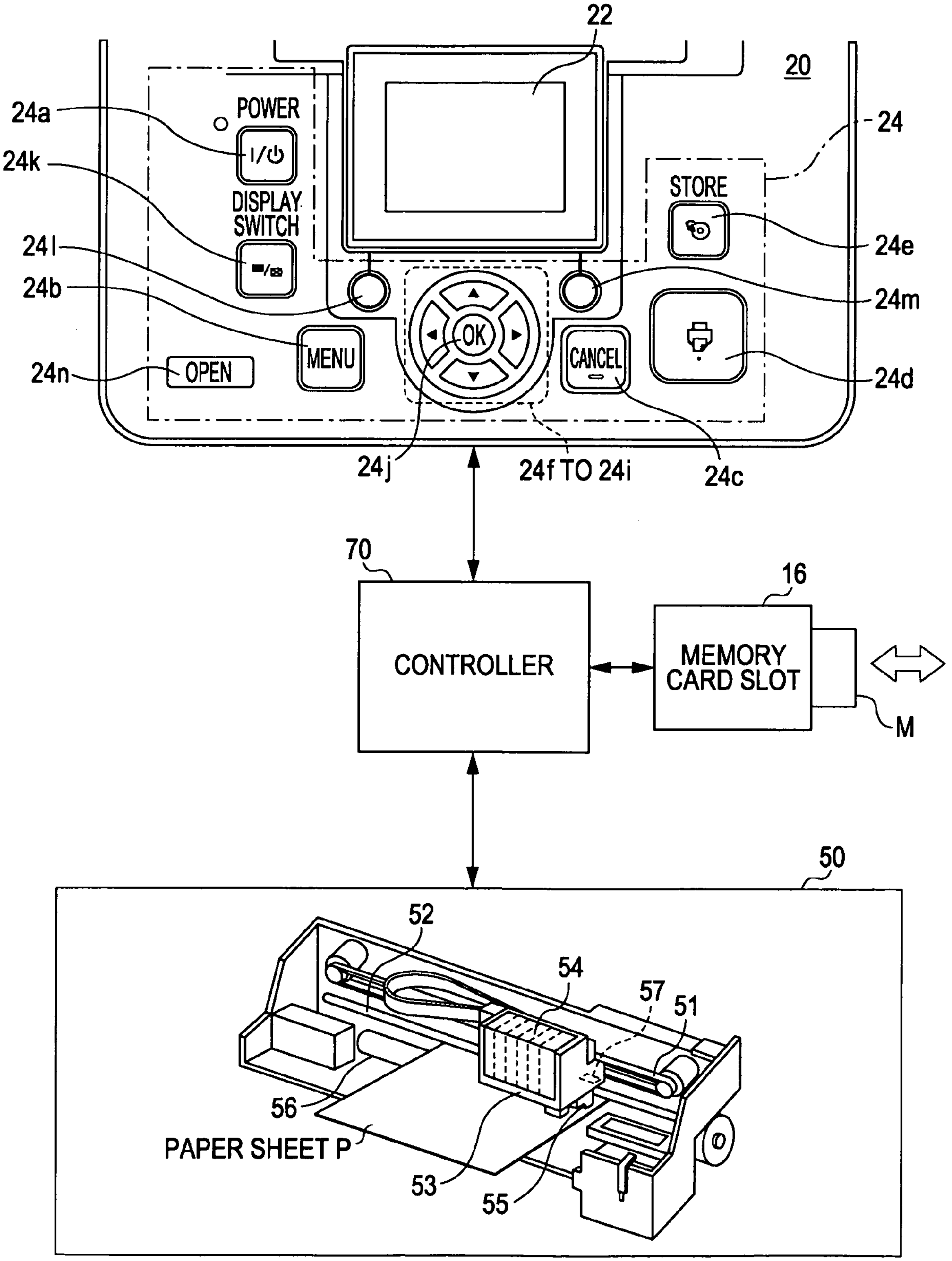
FIG. 2 is a diagram illustrating an overall internal configuration of the photo printer.

FIG. 1 is a perspective view illustrating a photo printer equipped with an LCD controller 76, which is an example of a screen display control device according to the invention. FIG. 2 is a diagram illustrating an overall internal configuration of the photo printer. A photo printer 10 has a printing mechanism 50 (see FIG. 2) inside a printer body 12 and prints an image on a paper sheet P in accordance with an operation command from a controller 70 (see FIG. 2) which controls the photo printer 10 on the whole. In addition, the printed paper sheet is discharged to a front surface of the printer body 12.

A front door 14 is openably mounted on the front surface of the printer body 12, as shown in FIG. 1. The front door 14 is a cover used to open and close the front surface of the printer body 12. When the front door 14 is opened, the front door 14 functions as a sheet discharging tray which receives the paper sheet P discharged from the print mechanism 50. In addition, a user is able to use various types of a memory card slot 16 formed on the front surface of the printer body 12. That is, when the front door 14 is opened, the user is able to insert a memory card M storing an image file, which is a printing target, into the memory card slot 16. An external medium storing an image file is not limited to the memory card, but may be a USB memory, a disk medium, or the like. An electronic apparatus such as a digital camera or a cellular phone storing images is connected to the photo printer 10 through a cable or infrared rays to function as the external medium.

An operational panel 20 is provided on the upper surface of the printer body 12 and a cover 30 is openably mounted on one side inside the upper surface of the printer body 12. The cover 30 is a resin plate formed with a size covering the upper surface of the printer body 12 and the surface of the operational panel 20 is exposed to the outside (see FIG. 1). On the other hand, when the cover 30 is closed, the cover 30 covers the entire operational panel 20.

The operational panel 20 includes a display unit 22 which is configured by as an LCD display displaying texts, figures, symbols, and the like and a group of buttons 24 arranged around the display unit 22. As shown in FIG. 2, the group of buttons 24 includes: a power button **24*a* used to turn on and off a power source; a menu button 24*b* used to allow a main menu to be displayed on a screen; a cancel button 24*c* used to cancel an operation during performing the operation or interrupt a printing process on the paper sheet P during the printing process; a print button 24*d* used to instruct a print execution onto the paper sheet P; a store button 24*e* used to store an edited image to the memory card M inserted into the memory card slot 16; upper, lower, right, and left arrow buttons 24*f* to 24*i* used to select a desired option among plural options displayed on the display unit 22, move a cursor, or other operations; an OK button 24*j* disposed in the center of the upper, lower, right, and left arrow buttons 24*f* to 24*i* and used to instruct the option selected by the arrow buttons 24*f* to 24*i*; a display switch button 24*k* used to switch screen display on the display unit 22; a left guide selection button 24*l* used to select a left guide displayed on the display unit 22; a right guide selection button 24*m* used to select a right guide displayed on the display unit 22; and a sheet discharging tray opening button 24*n* used to open the front door 14** functioning as a sheet discharging tray.

In order to confirm display details of the display unit 22, a window 32 having the same size as that of the display unit 22 is provided in the cover 30. That is, when the cover 30 is closed, the user is able to confirm the display details of the display unit 22 through the window 32. On the other hand, when the cover 30 is opened, the display unit 22 is configured so as to adjust a desired angle as shown in FIG. 1.

When the cover 30 is opened, the cover 30 is configured so as to be inclined toward the rear side with respect to the operational panel 20 to be maintained and used as a tray supplying the paper sheet P to the printing mechanism 50. Inside the operational panel 20, a sheet feeding port 58 of the printing mechanism 50 is provided and a pair of sheet guides 59 operated in a slide manner in right and left direction so that a guide width is matched with the width of the paper sheet are also provided.

The paper sheet P is fed to the printing mechanism 50 through the sheet feeding port 58 to perform the printing process. As shown in FIG. 2, the printing mechanism 50 is provided with a carriage 53 which is driven by timing belt 51 suspended in a loop shape in left and right directions to reciprocate in the right and left direction along a guide 52. The carriage 53 is provided with a sheet end detecting sensor 57 which detects the upper, lower, right, and left ends of the paper sheet P. That is, the sheet end detecting sensor 57 is capable of detecting the right and left ends of the paper sheet P to recognize the width of the paper sheet P or detecting the rear end of the paper sheet P during the printing process to recognize the length of the paper sheet P, when the carriage 53 scans the paper sheet P fed to the sheet feeding port 58 the right and left directions before the printing process.

Ink cartridges 54 individually containing colors such as cyan, magenta, yellow, and black are mounted on the carriage 53. The ink cartridges 54 are connected to a printing head 55. In addition, the printing head 55 ejects ink from nozzles (not shown) onto the paper sheet P by pressurizing ink from the ink cartridges 54. In this embodiment, the printing head 55 employs a method of pressurizing the ink with application of voltage to a piezoelectric element and deforming the piezoelectric element to pressurize the ink, but may employ a method of applying voltage to a heating resistant member (for example, a heater) and heating the ink to pressurize the ink by bubbles. The paper sheet P subjected to the printing process is transported to the opened front door (sheet discharging tray) 14 by a transport roller 56.

Even though not shown in the drawing, a battery pack is configured to be mounted in the rear surface of the printer body 12 to allow the battery pack to operate the photo printer 10 without connecting the photo printer 10 to a commercial power source. The photo printer 10 is able to be carried with ease and used anywhere, since the photo printer 10 is operated by the battery back and used as a stand-alone printer which does not need to be connected to a host computer.

Figure 3:
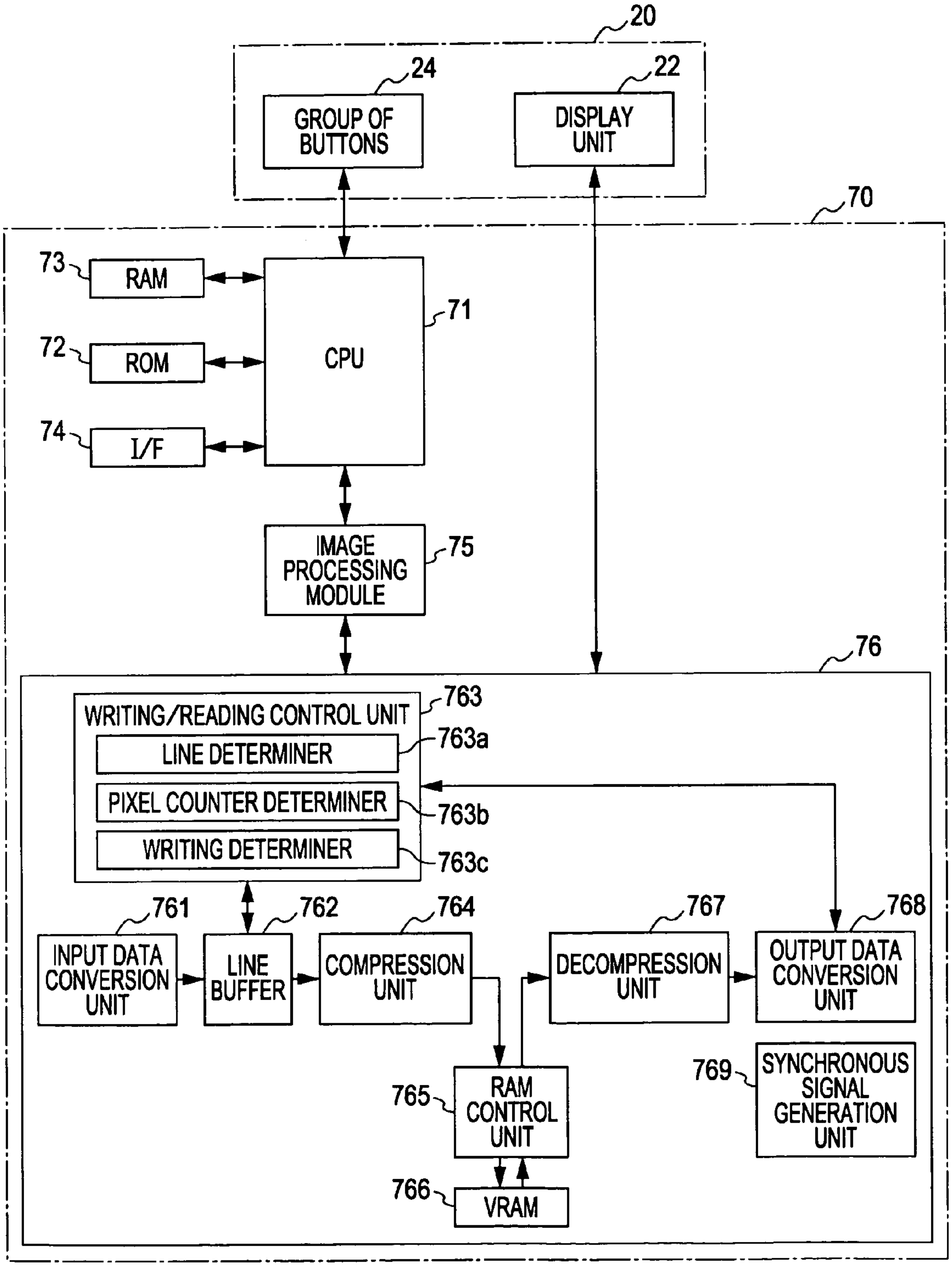
FIG. 3 is a block diagram illustrating the configuration of a controller.
Figure 4A:
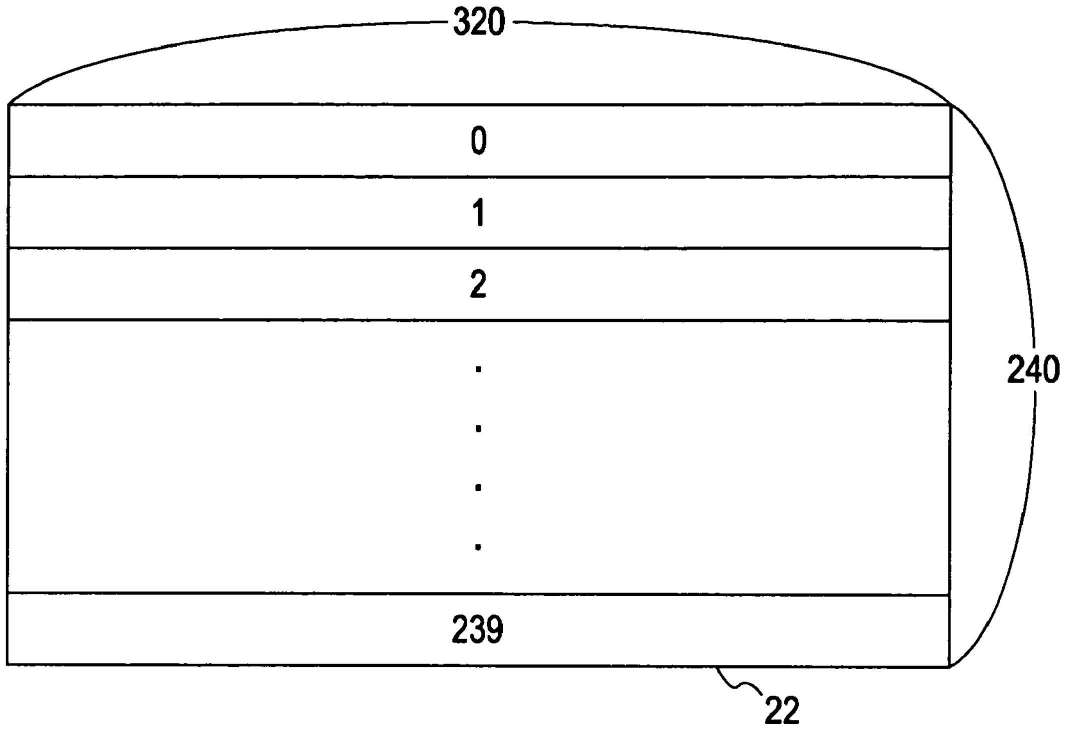
FIGS. 4A and 4B are diagrams illustrating the configurations of a display unit and a VRAM, respectively.
Figure 4B:
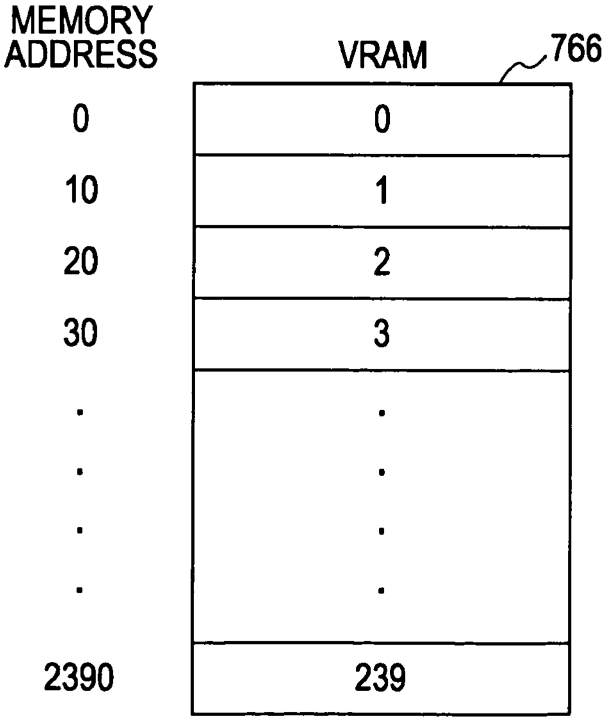

FIG. 3 is a block diagram illustrating the configuration of the controller 70. FIGS. 4A and 4B are diagrams illustrating the configurations of the display unit 22 and the VRAM 766, respectively. As shown in FIG. 3, the controller 70 is configured as a micro processor operated mainly by a CPU 71 and includes a ROM 72 which stores various processing programs, various data, various programs, various tables, and the like, a RAM 73 which temporarily stores data, and an interface (I/F) 74 which enables the printing mechanism 50 and the memory card slot 16 to communicate with each other. In addition, the controller 70 stores an edited image or the like to the memory card M and outputs a control signal to the printing head 55 of the printing mechanism 50 or a control signal to the display unit 22 of the operational panel.

The controller 70 is provided with an image processing module 75 which performs necessary image processing on image data supplied from an external storage medium such as the memory card M through the interface 74. The image processing module 75 has a function of generating the image data corresponding to an image proper to a printer, such as a menu screen, for displaying the image data on the display unit 22.

RGB image data output from the image processing module 75 are supplied to the LCD controller 76 (corresponding to "a screen display control device"8 according to the invention) which controls displaying of the display unit 22. Hereinafter, the display unit 22 configured by an LCD display has pixels of 320 dots×240 dots of a QVGA (Quarter Video Graphics Array) mode. One line of image data is formed by image data corresponding to 320 dots and one image is formed by line data corresponding to 240 lines (see FIG. 4A).

The LCD controller 76 includes a synchronous signal generation unit 769 which generates horizontal and vertical synchronous signals for controlling timing at which an image is displayed on the display unit 22 and various synchronous signals. In addition, the LCD controller 76 includes an input data conversion unit 761 which converts serial data input from the image processing module 75 into parallel data and a line buffer 762 (corresponding to "a buffer memory" according to the invention) which temporarily maintains one-line data of the image data converted into the parallel data by the input data conversion unit 761. In addition, the LCD controller 76 includes a compression unit 764 which is provided on the rear end of the line buffer 762 and compresses the input image data in a line unit, a rewritable VRAM 766 (corresponding to "an image memory" according to the invention) to which the compressed data compressed in a line unit by the compression unit 764 are written in non-synchronization with a reading process, a decompression unit 767 which decompresses the compressed data periodically read from the VRAM 766 in synchronization with the horizontal and vertical synchronous signals of the screen display on the display unit 22 to restore an original image data, and an output data conversion unit 768 which performs data conversion to output the image data decompressed and restored by the decompression unit 767 onto the display unit 22. With such a configuration, the image data decompressed and restored by the decompression unit 767 are output and displayed onto the display unit 22 through the output data conversion unit 768. In this embodiment, the compression unit 764 is configured to compress the image data using difference information (accord status) of adjacent image data. However, the method of compressing image data is not limited thereto, but known various compression methods may be used. Since the method of compressing image data is a known technique, detailed description is omitted.

As shown in FIG. 4B, the VRAM 766 at least has an area in which the compressed data of 240 lines (corresponding to one image) compressed by the compression unit 764 are stored. In this embodiment, the compressed data of lines 0, 1, 2, . . . , and 239 are stored in storage areas indicated by memory addresses 0, 10, 20, . . . , and 2390 of the VRAM 766, respectively. In addition, there is provided a writing/reading control unit 763 which controls a process of writing the compressed data to the VRAM 766 and processes of writing and reading the image data to and from the line buffer 762. Timing at which the compressed data are written to the VRAM 766 is controlled by allowing the writing/reading control unit 763 to output a control command to a RAM control unit 765.

Next, the writing/reading control unit 763 will be described in more detail. As shown in FIG. 3, the writing/reading control unit 763 includes a line determiner **763*a* which determines whether a line of the compressed data written to the VRAM 766 is the same as a line of the compressed data read from the VRAM 766 by comparison. That is, by comparing a counter value (writing line) of a writing line counter (not shown) constituted by a memory or the like to a counter value (reading line) of a reading line counter (not shown) constituted by a memory or the like, it is possible to compare the line of the written compressed data to the line of the read compressed data. In addition, the writing/reading control unit 763 includes a pixel counter determiner 763***b* which determines whether a value of a writing pixel counter (not shown) constituted by a memory or the like to a value of a reading pixel counter (not shown) by comparison. The value of the writing pixel counter is added, whenever one-pixel data are written from compressed one-line data compressed by the compression unit 764 to the VRAM 766. In addition, the value of the reading pixel counter is added on the basis of a clock signal generated by the synchronous signal generation unit 769 in order to specify timing at which compressed one-pixel data are read from the VRAM 766. The writing pixel counter and the reading pixel counter will be described with reference to FIG. 5.

Figure 5:
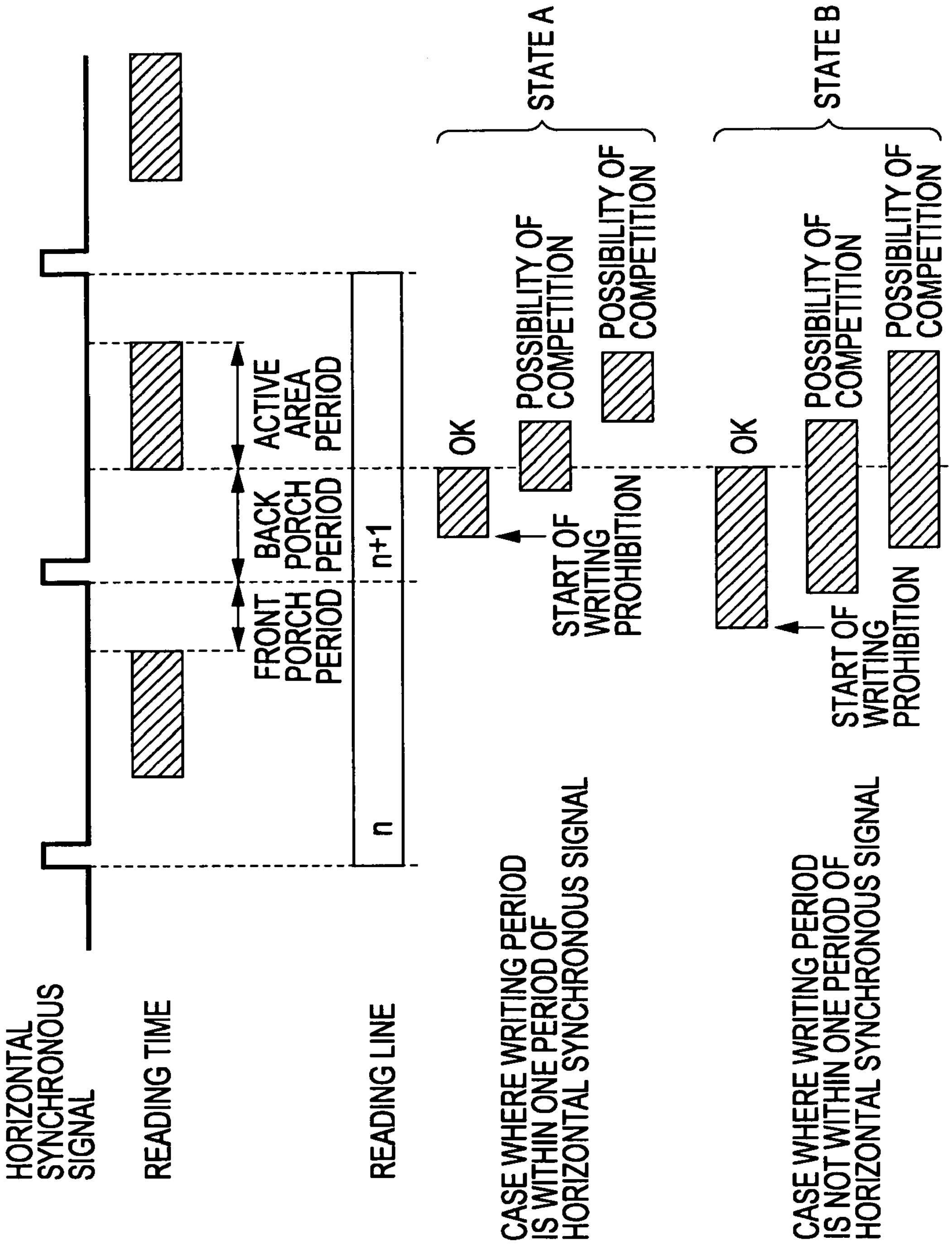
FIG. 5 is a diagram illustrating timings at which compressed data is written and read.

FIG. 5 is a diagram illustrating timings at which the compressed data of each line are written and read. As shown in FIG. 5, the compressed one-line data are read from the VRAM 766 during one period in which the horizontal synchronous signal is output. In the process of reading the compressed data, one period of the horizontal synchronous signal is divided into three sub-periods, that is, "a back porch period" from time at which the horizontal synchronous signal is output to time at which the process of reading the compressed data starts, "an active area period" in which the compressed data is read and the image data is output onto the display unit 22, and "a front porch period" from time at which the process of reading the compressed data ends to time at which a subsequent horizontal synchronous signal is output. Each of the periods is a fixed value which is set in advance depending on the configuration of the resolution number of the display unit 22 or the method of compressing the compressed data stored in the VRAM 766. Here, the reading pixel counter is reset to "0" upon starting each of the periods and is added whenever a clock signal specifying the timing at which the compressed one-pixel data generated by the synchronous signal generation unit 769 are read. Therefore, when the horizontal synchronous signal is output and the back porch period is started, a process of adding the reading pixel counter from "0" is also started. Subsequently, when the value of the reading pixel counter becomes a value preset as the back porch period, the reading pixel counter is reset to "0" and the active area period is started to actually start the process of reading the compressed data. Finally, when the value of the reading pixel counter becomes a value preset as the active area period, that is, when the process of reading the compressed one-line data is completed, the reading pixel counter is reset to "0" and the front porch period is started. In addition, the compressed one-pixel data are read, whenever the clock signal is output. A signal indicating to which period a present period belongs among the above-described three periods is output in real time from the output data conversion unit 768 to the writing/reading control unit 763.

On the other hand, since the process of writing the compressed data to the VRAM 766 is performed in non-synchronization with the reading process described above, the process of writing the compressed data is performed irrespective of the timing at which the horizontal and vertical synchronous signals are output. Here, the reading pixel counter is reset to "0" upon starting the process of writing the compressed one-line data and the reading pixel counter is added whenever the compressed one-pixel data are written to the VRAM 766. As shown in FIG. 5, the period in which the compressed one-line data are written to the VRAM 766 is a fixed value determined depending on the size (length of the compressed one-line data) of the display unit 22. In addition, according to the configuration of the display unit 22, there are two cases, that is, a case (state A) where a writing period is within one period of the horizontal synchronous signal and a case (state B) where the writing period is not within one period of the horizontal synchronous signal but extended over two periods of the horizontal synchronous signal.

The writing/reading control unit 763 includes a writing determiner 763*c* which determines whether the process of writing the compressed one-line data to be written to the VRAM 766 is prohibited at present, that is, whether the processes of writing and reading the compressed data of the same line to and from the VRAM 766 compete with each other on the basis of results determined by the line determiner 763*a* and the pixel counter determiner 763*b* and the reading period ("the back porch period", "the active area period", and "the front porch period") output from the output data conversion unit 768.

The fact that the processes of writing and reading the compressed data of the same line to and from the VRAM 766 compete with each other means that the process of writing newly compressed data of one line is performed ahead during the process of reading the compressed data of the one line stored in the VRAM 766, or the process of reading the compressed data of one line is performed ahead during the process of writing newly compressed data of the one line to the VRAM 766. In this embodiment, a period described below is a writing prohibition period in which this problem may occur and thus the process of writing the newly compressed data to the VRAM 766 is prohibited. Next, a process in which the writing determiner 763*c* determines whether the present period is the writing prohibition period will be described with reference to FIG. 6.

FIG. 6 is a diagram illustrating an example of writing prohibition determination. As shown in FIGS. 5 and 6, the processes of writing and reading the compressed data of the same line to and from the VRAM 766 compete with each other depending on timing at which the process of writing the compressed data is started. First, a process in "the back porch period" and "the front porch period" will be described. Here, "a BP (back porch) prohibition pixel counter value" and "an FP (front porch) prohibition pixel counter value" in FIG. 6 refers to a value which is preset in accordance with the length of the period in which the compressed data of one line is written to the VRAM 766. In addition, "the BP (back porch) prohibition pixel counter value" and "the FP (front porch) prohibition pixel counter value" refers to a value in which the process of reading the compressed data of the same line from the VRAM 766 is started before completion of the process of writing the compressed data of one line to the VRAM 766, when the process of writing the compressed data is started after the reading pixel counter value exceeds the BP prohibition pixel counter value and the FP prohibition pixel counter value (see an arrow indicating "start of writing prohibition" in FIG. 5). When the process of reading the compressed data of one line is started before completion of the process of writing the compressed data of the one line to the VRAM 766, the process of reading the compressed data from the VRAM 766 is periodically performed in synchronization with the screen display on the display unit 22, irrespective of the process of writing the newly compressed data to the VRAM 766. Therefore, when the process of reading the compressed data is performed ahead during the process of writing the newly compressed data of the VRAM 766, a problem occurs in that the processes of writing and reading the compressed data of the same line to and from the VRAM 766 may compete with each other.

In the example shown in FIG. 5, when the writing process is started after the value of the reading pixel counter value exceeds each prohibition pixel counter value, a problem occurs in that the writing process may be started at timing later than the timing pointed by the arrow of "the start of writing prohibition" in FIG. 5 and in that the processes of writing and reading the compressed data compete with each other since the process of reading the compressed data of one line from the VRAM 766 is started before completion of the process of writing the compressed data of the one line to the VRAM 766 (see "possibility of competition" in FIG. 5).

Therefore, the writing determiner 763*c* determines a period in which the processes of writing and reading the compressed data of the same line to and from the VRAM 766 may compete with other, as described above, as the writing prohibition period, when the writing/reading control unit 763 is requested to write the compressed data from the line buffer 762. In addition, the writing/reading control unit 763 prohibits the process of writing the compressed data of the line to the VRAM 766 by prohibiting the process of writing the newly compressed data to the VRAM 766 depending on a result of the writing prohibition period determined by the writing determiner 763*c* and maintaining the image data of the line to be written in the line buffer 762.

On the other hand, during "the active area period", a vacant area is generated in a storage area of the VRAM 766 where the compressed data of one line is stored in response to the process of reading the compressed data of the one line from the VRAM 766. Therefore, by writing the compressed pixel data corresponding to the vacant area, that is, only the compressed pixel data which having already been read from the VRAM 766 among the newly compressed data of one line to be written to the VRAM 766, it is possible to avoid the problem that the process of writing the newly compressed data of one line is performed ahead during the process of reading the compressed data of the one line stored in the VRAM 766.

In this embodiment, the writing determiner 763*c* determines whether to permit the process of writing the newly compressed pixel data to the vacant area of the VRAM 766, when the vacant area is generated. In addition, the writing/reading control unit 763 controls the process of writing the newly compressed data of one line to the vacant area of a pixel unit generated in the VRAM 766 in a pixel unit, depending on the determination result obtained by permission to write the compressed data in the vacant area of the VRAM 766 by the writing determiner 763*c*. That is, the writing/reading control unit 763 controls the process of writing the compressed pixel data, which are formed by compressing the pixel data corresponding to the vacant area by the compression unit 764 among the image data prohibited from being written to the VRAM 766 during the writing prohibition period and maintained in the line buffer 762, to the vacant area in a pixel unit.

In this embodiment, as described above, the process of reading the compressed data from the VRAM 766 is performed in synchronization with the screen display on the display unit 22, that is, in synchronization with the horizontal and vertical synchronous signals from the synchronous signal generation unit 769. On the other hand, the process of writing the compressed data to the VRAM 766 is performed in non-synchronization with the process of reading the compressed data performed for the screen display. In addition, since the compressed data of each line is written to a predetermined area of the VRAM 766, a problem occurs in that the processes of writing and reading the compressed data to and from the VRAM 766 may compete with each other, as described above. In this embodiment, the vacant area refers to an area where the compressed pixel data have already been read from the VRAM 766 in accordance with the screen display on the display 22 among the storage areas of the VRAM 766. Since the compressed pixel data stored in the corresponding area have already been read, there is no influence on the restoration of the compressed pixel data read from the storage areas subsequent to the corresponding area of the VRAM 766 even upon writing the newly compressed pixel data to the corresponding area. Moreover, after each compressed pixel data is read from the corresponding area, the corresponding area of the VRAM 766 may be initialized or the already compressed pixel data may be maintained in the corresponding area. Upon writing the newly compressed pixel data to the corresponding area, the newly compressed pixel data may be rewritten to the already compressed pixel data. Next, an example of the reading process will be described with reference to FIG. 7.

1. Example of Reading Process

Reading Process

Figure 7:
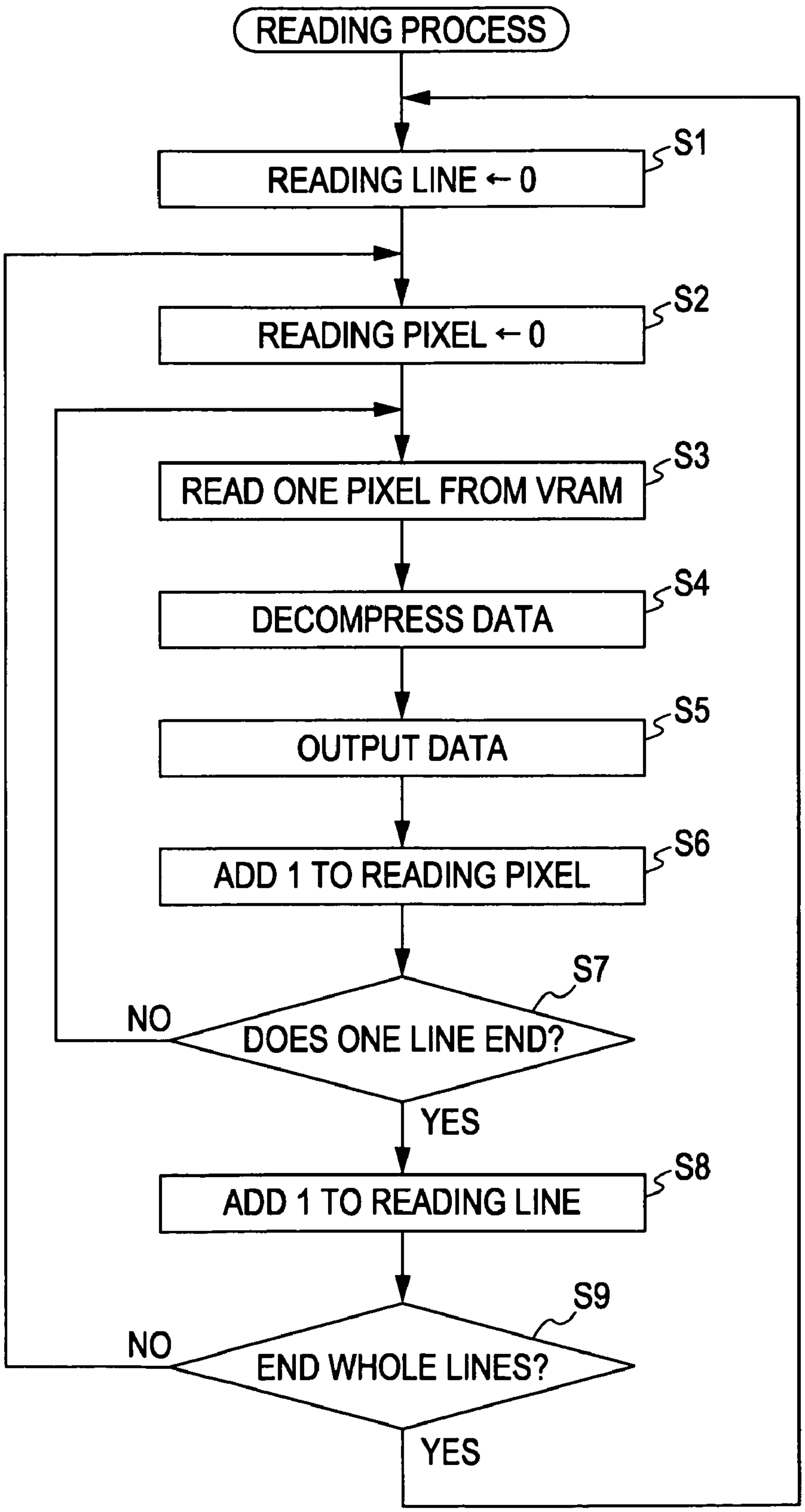
FIG. 7 is a diagram illustrating an example of a reading process.

FIG. 7 is a diagram illustrating an example of the process of reading the compressed data from the VRAM 766 to restore the image data. The reading process in FIG. 7 is a process performed in synchronization with the vertical synchronous signal output every 1/60 second by the synchronous signal generation unit 769. In addition, the process of reading the compressed data of each line from the VRAM 766 is performed in synchronization with the horizontal synchronous signal output by the synchronous signal generation unit 769. First, when the vertical synchronous signal is output from the synchronous signal generation unit 769, the counter value (reading line) of the reading line counter constituted by a memory or the like is set to "0" (Step S1). In addition, when the horizontal synchronous signal is output from the synchronous signal generation unit 769, the counter value (reading pixel) of the reading pixel counter constituted by a memory or the like is set to "0" (Step S2). The reading line which is the counter value of the reading line counter refers to a value indicating a line number to be read in future from the VRAM 766 among the compressed data. The reading pixel which is the counter value of the reading pixel counter refers to a value added whenever the compressed pixel data for one pixel is read from compressed pixel data at the head of the compressed pixel data (320 data) constituting the compressed one-line data and refers to a value indicating which numbered pixel data from the head of the compressed pixel data is read to be restored.

Next, one compressed pixel data indicated by the reading line and the reading pixel is read from the VRAM 766 in Step S3, and each read pixel data is decompressed and restored by the decompression unit 767 (Step S4). Subsequently, the restored image (pixel) data in Step S4 is output to the output data conversion unit 768 and the display unit 22 (Step S5). Then, one is added to the counter value of the reading pixel counter (Step S6), and then it is determined whether the process of reading the compressed data of one line ends (Step S7).

When NO is determined in Step S7, the processes from Step S3 are repeatedly performed until the process of reading the compressed data of one line ends. Alternatively, when YES is determined in Step S7, one is added to the counter value of the reading line counter (Step S8), and it is determined whether the process of reading the compressed data of the whole lines ends in Step S9. When YES is determined in Step S9, the process proceeds to Step S1. When a subsequent vertical synchronous signal is output, the process is again performed from Step S1. Alternatively, when NO is determined in Step S9, the process is repeatedly performed from Step S2 until the process of reading the compressed data of the whole lines ends. Next, an example of the process of writing the compressed data to the VRAM 766 will be described with reference to FIGS. 8 to 11 according to this embodiment.

2. Example of Writing Process

Figure 8:
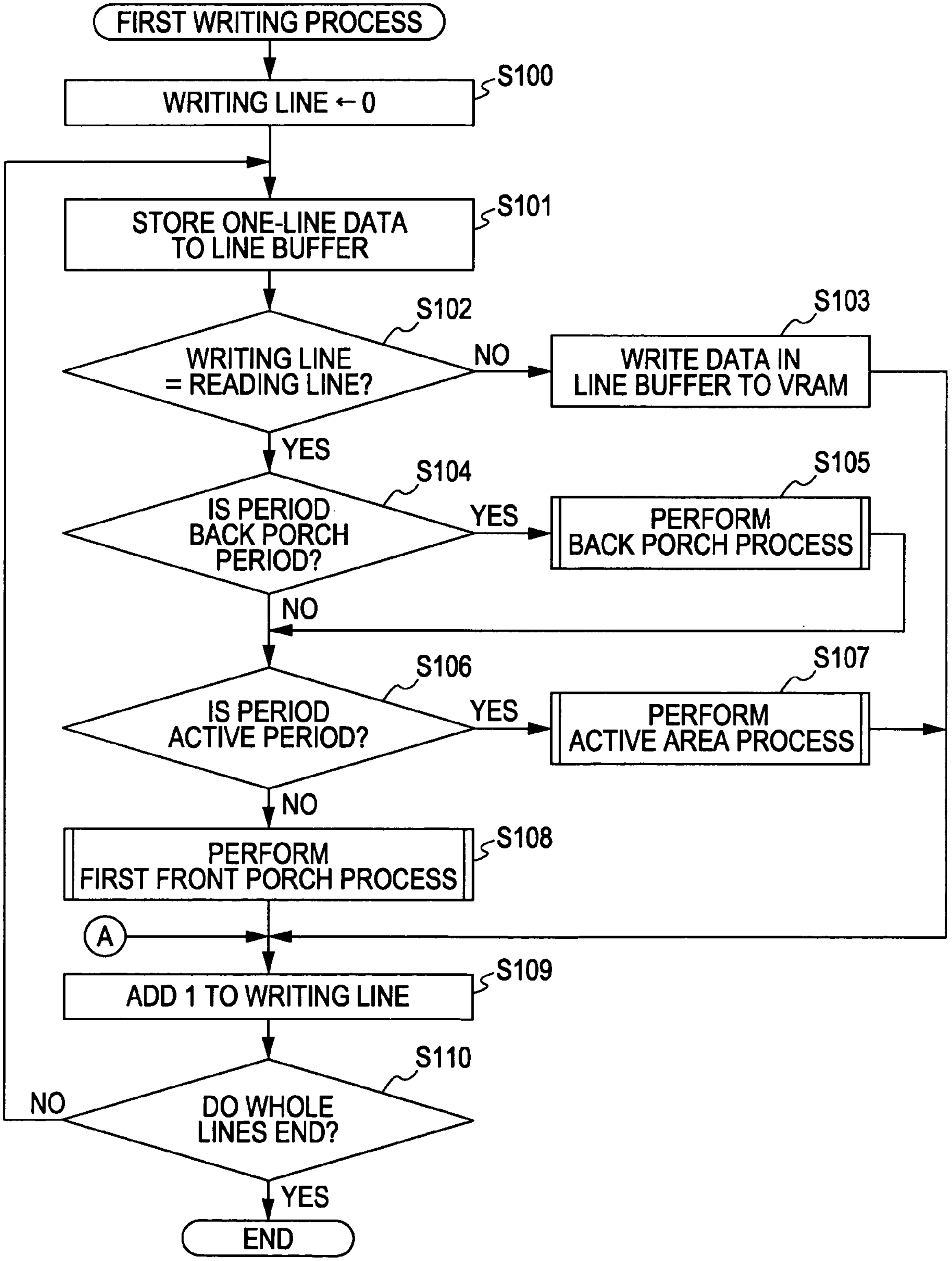
FIG. 8 is a diagram illustrating an example of a writing process.
Figure 9:
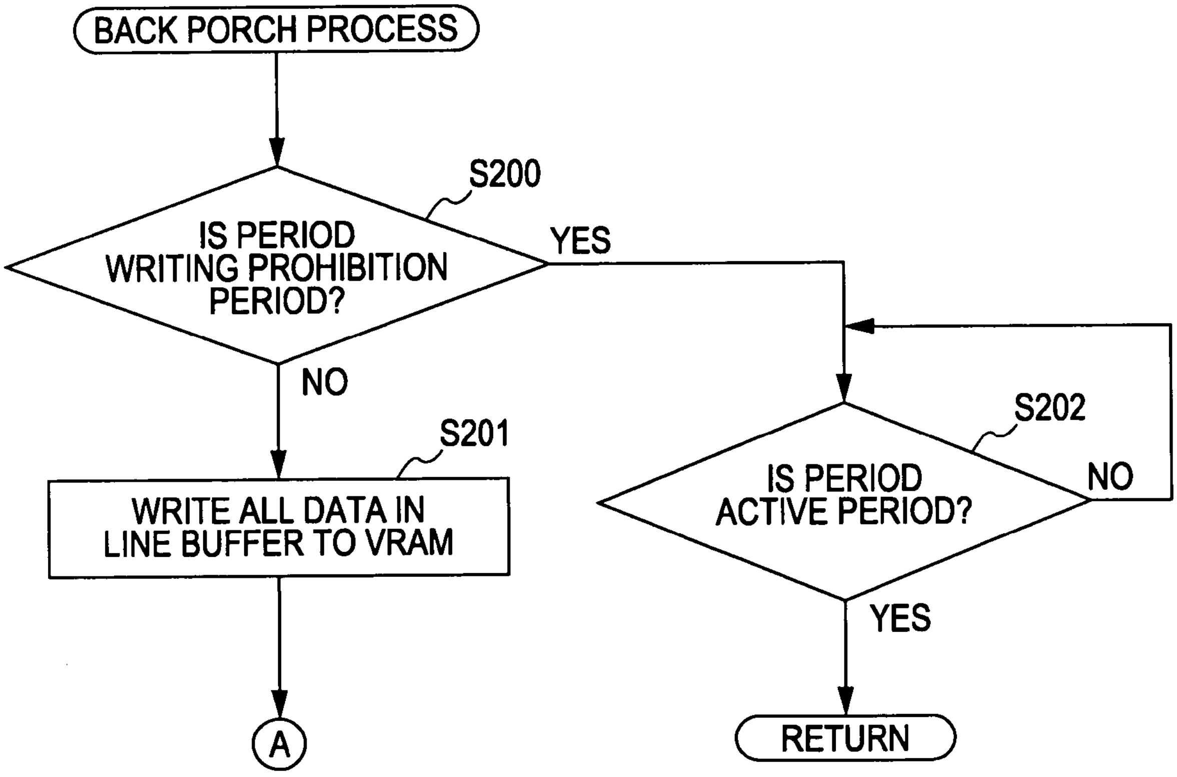
FIG. 9 is a diagram illustrating a back porch process.

FIG. 8 is a diagram illustrating a first writing process as an example of the writing process. FIG. 9 is a diagram illustrating the back porch process.

Figure 10:
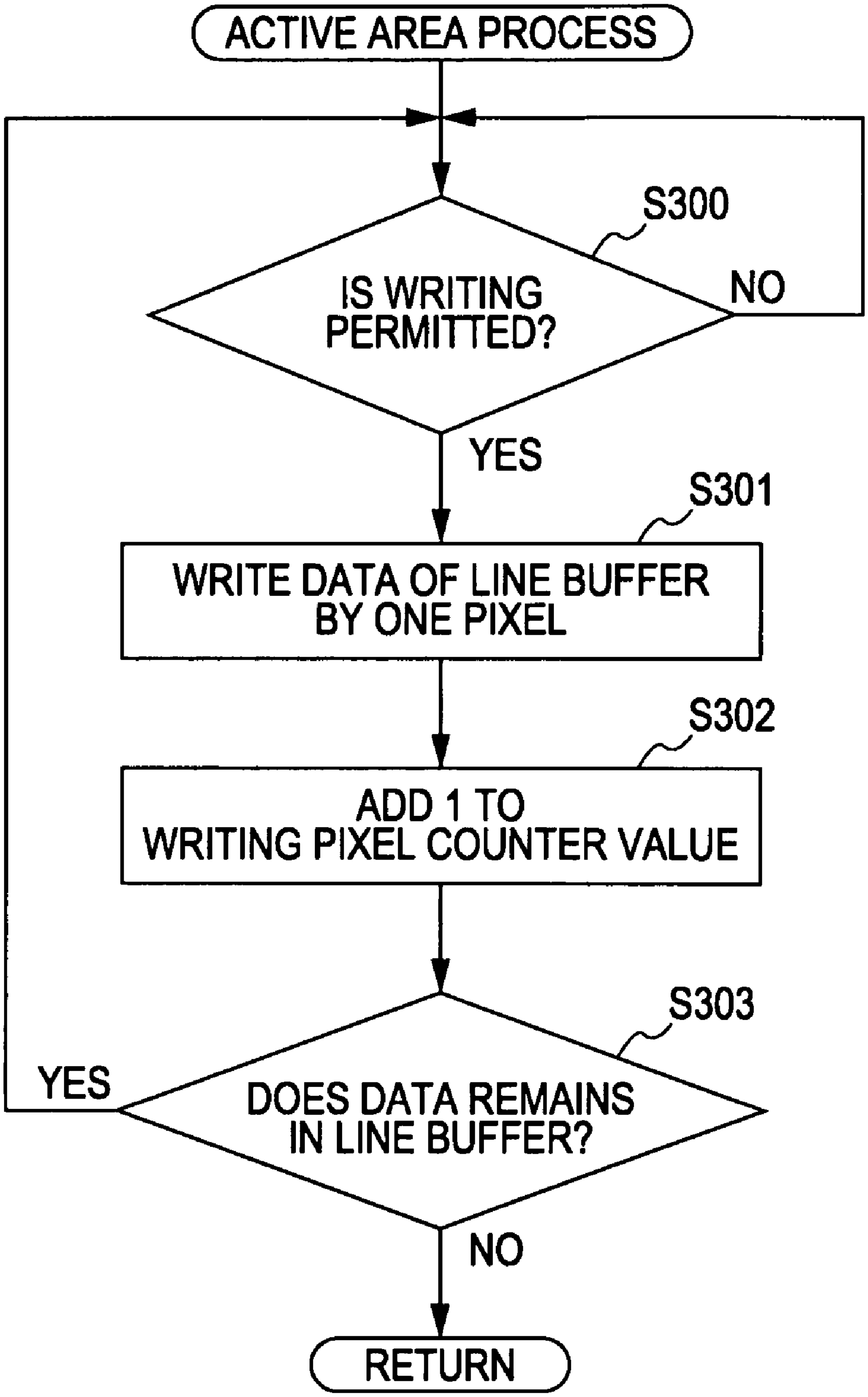
FIG. 10 is a diagram illustrating an active area process.
Figure 11:
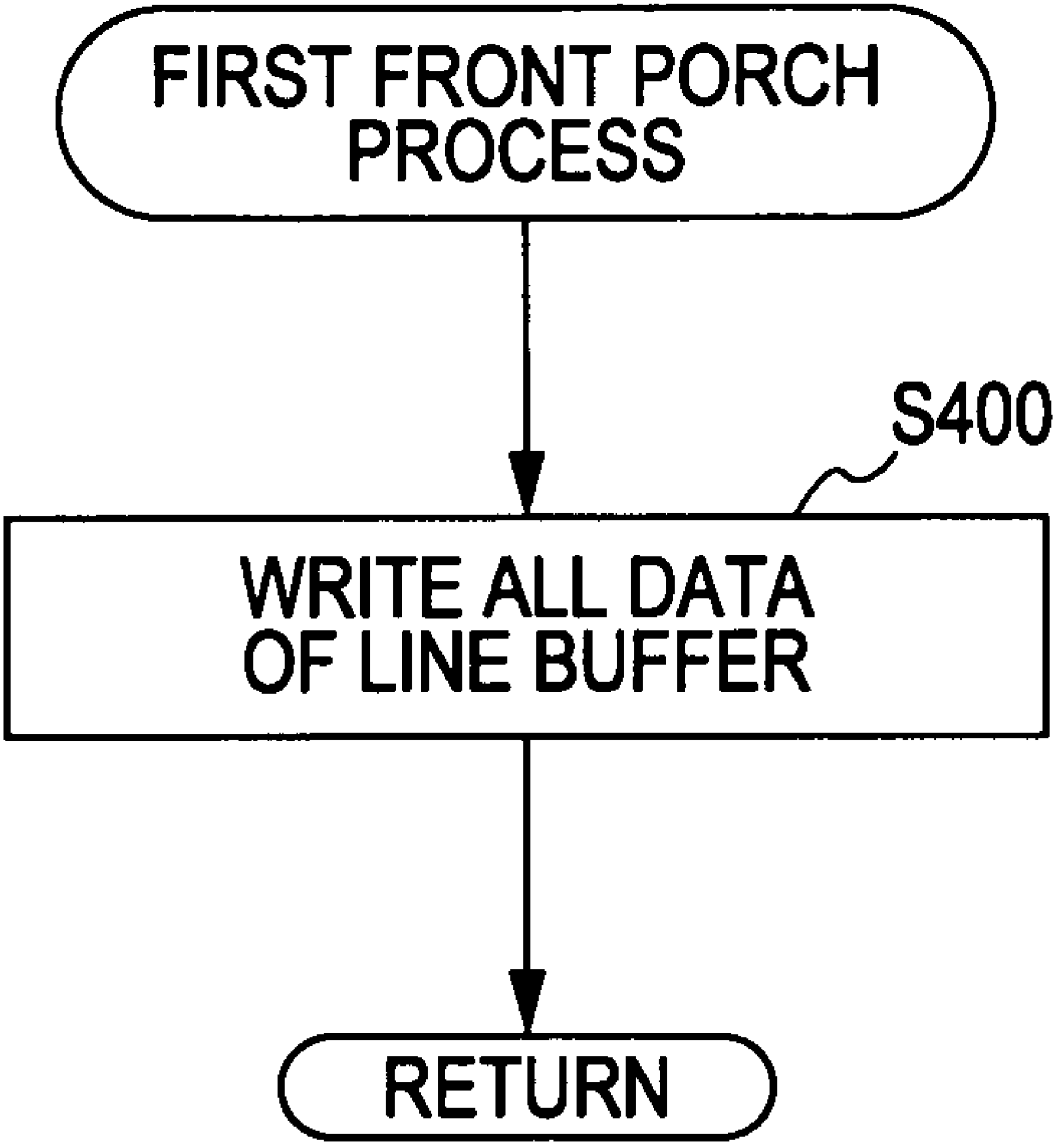
FIG. 11 is a diagram illustrating a first front porch process.

FIG. 10 is a diagram illustrating the active area process. FIG. 11 is a diagram illustrating a first front porch process. The first writing process shown in FIG. 8 is a process performed in a period in which the compressed data of one line is written in State A, as shown in FIGS. 5 and 6.

First Writing Process

The first writing process will be descried with reference to FIG. 8. First, when each of image data which is processed by the image processing module 75 in order to be displayed on the display unit 22 is input to the input data conversion unit 761 of the LCD controller 76, the counter value (writing line) of the writing line counter constituted by a memory or the like is set to "0" (Step S100, see FIGS. 4A and 4B). That is, in a process described below, it is determined whether compressed data of a zeroth line is written to the VRAM 766. For convenient description, the first writing process of writing the compressed data of the zeroth line will be described with reference to FIGS. 4A, 4B, and 5. In addition, the writing line which is the counter value of the writing line counter refers to a value indicating a line number of the image data to be written to the VRAM 766.

Next, the image data of the zeroth line set as the writing line in Step S100 is temporarily stored in the line buffer 762 (Step S101). Subsequently, the line determiner 763*a* determines whether the writing line (zeroth line) and the reading line, that is, the line from which the reading process is being performed are the same (Step S102). When NO is determined in Step S102, the writing determiner 763*c* determines that the processes of writing and reading the compressed data of the zeroth line do not compete with each other, and then a command for storing all the image data stored in the line buffer 762 to an area of memory address "0" of the VRAM 766 is issued from the writing/reading control unit 763 to the RAM control unit 765 (Step S103). That is, the image data of the zeroth line stored in the line buffer 762 are compressed by the compressed unit 764 and then written to the VRAM 766.

Alternatively, when YES is determined in Step S102, the writing determiner 763*c* determines whether a present period is the back porch period on the basis of the signal output from the output data conversion unit 768 (Step S104). When YES is determined, the back porch process described below is performed (Step S105). Alternatively, when NO is determined in Step S104, the writing determiner 763*c* determines whether a present period is an active period on the basis of the signal output from the output data conversion unit 768 (Step S106). When YES is determined in Step S106, the active area process described below is performed (Step S107).

Alternatively, when NO is determined in Step S106, a first front porch process described below is performed, and then the process proceeds to Step S109. Then, one is added to the counter value (writing line) of the writing line counter, and it is determined whether the process of writing the compressed data corresponding to the whole lines (240 lines) ends (Step S110). When YES is determined, the process ends. Alternatively, when NO is determined, the process proceeds to Step S101, and the same processes are repeatedly performed.

Back Porch Process

The back porch process will be described with reference to FIG. 9. First, the writing determiner 763*c* determines whether a present period is the writing prohibition period on the basis of the result determined by the pixel counter determination unit 763*b* (Step S200, see FIGS. 5 and 6). When NO is determined, a command for writing the image data stored in the line buffer 762 to the VRAM 766 is issued from the writing/reading control unit 763 to the RAM control unit 765 (Step S201). That is, when the image data of the zeroth line stored in the line buffer 762 are compressed by the compression unit 764 and written to the VRAM 766, the process ends and proceeds to Step S109 of FIG. 8. Alternatively, when YES is determined in Step S200, the process stands by until it is determined that a present period is the active period on the basis of the signal output by the output data conversion unit 768, and then the process ends (Step S202). According to the back porch process, even when the reading line and the writing line are the same, the process of writing the compressed data is performed as long as the process of writing all the compressed data of one line to the VRAM 766 is possible before start of the process of reading the compressed data from the VRAM 766. Therefore, it is possible to effectively write the compressed data to the VRAM 766.

Active Area Process

The active area process will be described with reference to FIG. 10. First, the writing determiner 763*c* determines whether the writing process is permitted on the basis of the result determined by the pixel counter determiner 763*b* (Step S300, see FIGS. 5 and 6). When NO is determined, the process stands by until the writing process is permitted, that is, the vacant area is generated in the VRAM 766 (Step S300). Alternatively, when YES is determined in Step S300, that is, when the vacant area is generated in the VRAM 766, the one-pixel image data stored in the line buffer 762 is written (Step S301).

Subsequently, after one is added to the value of the writing pixel counter in Step S302, the writing determiner 763*c* determines whether the image data remain in the line buffer 762 on the basis of the value of the writing pixel counter (Step S303). When NO is determined, that is, when all the one-line image data stored in the line buffer 762 are written to the VRAM 766, the process ends. Alternatively, when YES is determined, the process proceeds to Step S300 and the same processes are repeatedly performed until the process of writing all the image data stored in the line buffer 762 to the VRAM 766 is completed.

First Front Porch Process

A first porch process will be described with reference to FIG. 11. In a case where the length of a period in which one-line compressed data is written to the VRAM 766 is a length in State A, as in FIGS. 5 and 6, the writing process is not prohibited due to the competition between the processes of writing and reading the compressed data, when timing at which the writing process starts is in the front porch period. Therefore, as shown in FIG. 11, when the timing at which the process of writing the compressed data starts is in the front porch period, a command for writing the image data stored in the line buffer 762 to the VRAM 766 is issued from the writing/reading control unit 763 to the RAM control unit 765 (Step S400). That is, when the image data stored in the line buffer 762 are compressed by the compression unit 764 and written to the VRAM 766, the process ends.

3. Another Example of Writing Process

Figure 12:
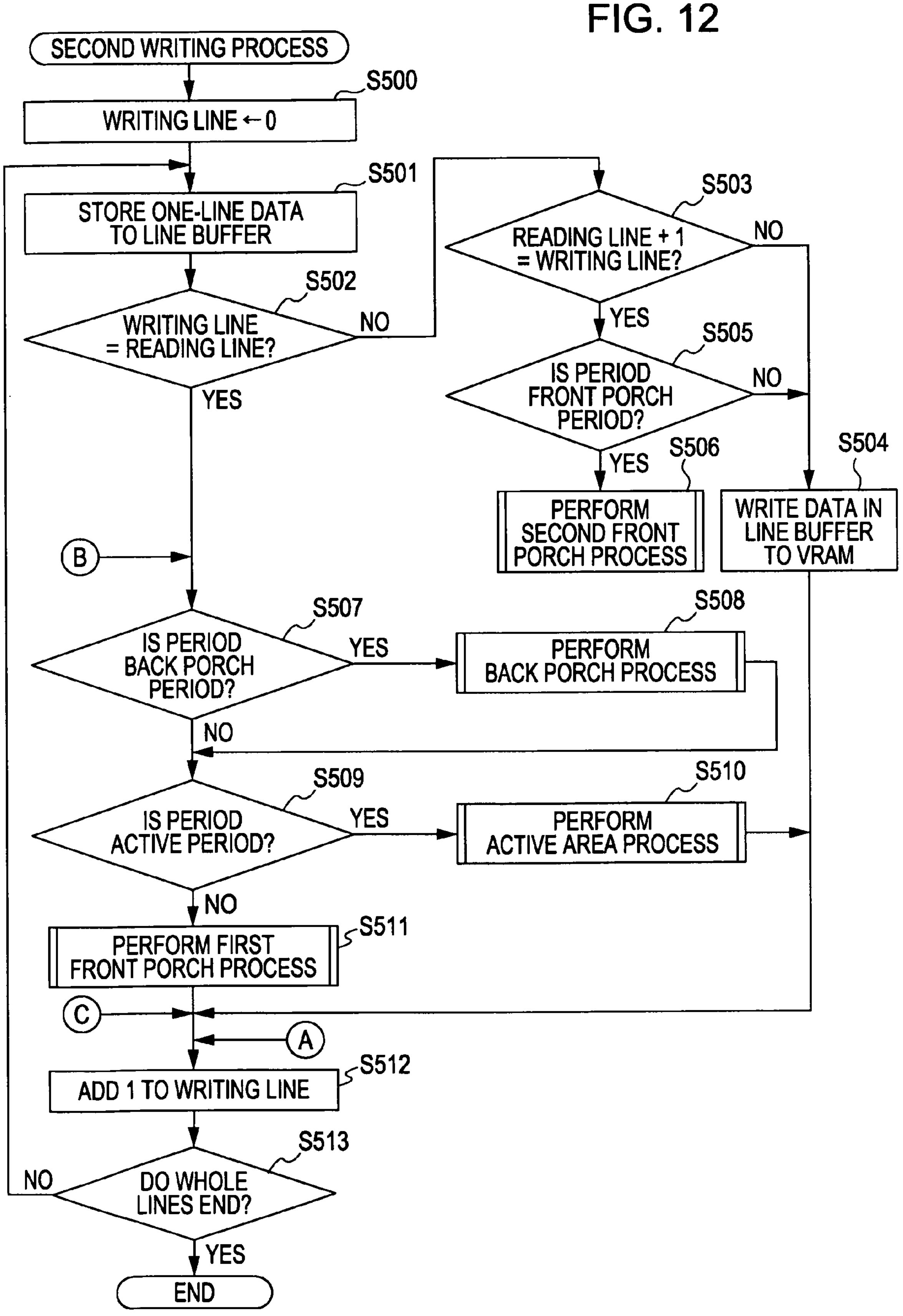
FIG. 12 is a diagram illustrating another example of the writing process.
Figure 13:
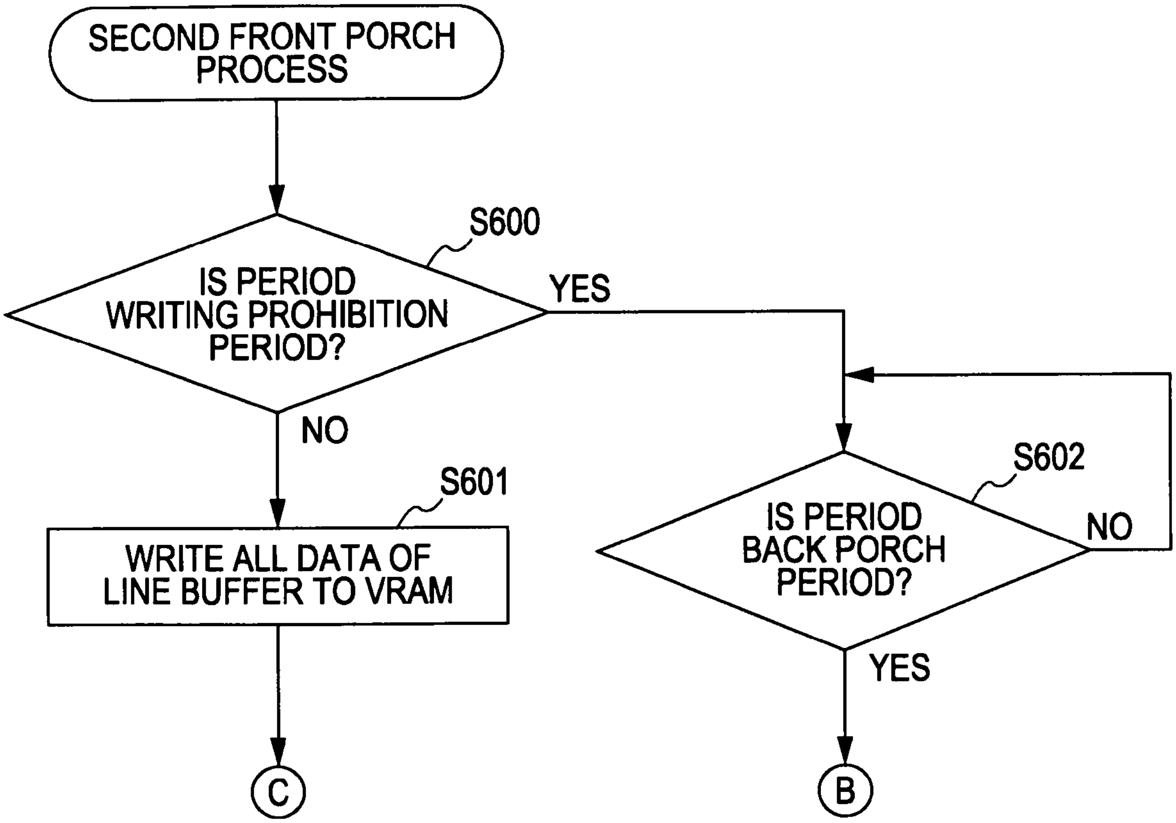
FIG. 13 is a diagram illustrating a second front porch process.

FIG. 12 is a diagram illustrating a second writing process as another example of the writing process. FIG. 13 is a diagram illustrating a second front porch process. The second writing process shown in FIG. 12 is a process performed when the writing period of the compressed data of one line is in State B (see FIGS. 5 and 6). A difference between the another example (second writing process) of the writing process and the first writing process of FIG. 7 is that a period in which the compressed one-line data are written to the VRAM 766 is long and timing at which the writing prohibition starts is different (see the arrow indicating "start of the writing prohibition" in FIG. 5). Specifically, the timing at which the process of writing the compressed data starts is "reading line+1=writing line". In addition, the reading process is performed in "the front porch period", and when "the reading pixel counter value is larger than the FP prohibition pixel counter value", the process of writing the compressed data to the VRAM 766 is prohibited (see "State B" and "front porch period HFP" of FIG. 6). In addition, the process of writing the compressed data to the VRAM 766 is usually prohibited during the back porch period in the case of "reading line=writing line". Therefore, the BP prohibition pixel counter value is initialized to "0". Hereinafter, a difference from the first writing process will be described, and description of the same process is omitted. In the second writing process, the second front porch process of determining whether the process of writing the compressed data to the VRAM 766 is prohibited is additionally performed.

Second Writing Process

The second writing process will be described with reference to FIG. 12. The line determiner 763*a* determines whether the writing line and the reading line are the same in Step S502 (Step S502). Since the process performed after YES is determined is the same as that in the first writing process, description thereof is omitted. Alternatively, when NO is determined in Step S502, the line determiner 763*a* determines whether the reading line is a line prior to the writing line by one line, that is, "reading line+1=writing line" (Step S503). When NO is determined in Step S503, the command is issued to the RAM control unit 765 and all the image data stored in the line buffer are compressed by the compression unit 764 to be written to the VRAM 766 (Step S504).

Alternatively, when YES is determined in Step S503, the writing determiner 763*c* determines whether a present period is the front porch period on the basis of the signal output by the output data conversion unit 768 (Step S505). When YES is determined in Step S505, the second front porch process described below is performed (Step S506). Alternatively, when NO is determined in Step S505, all the image data stored in the line buffer are compressed by the compression unit 764 and written to the VRAM 766 (Step S504). Since subsequent processes are the same as those in the first writing process, description thereof is omitted.

Second Front Porch Process

The second front porch process will be described with reference to FIG. 13. First, the writing determiner 763*c* determines whether a present period is the writing prohibition period on the basis of the result determined by the pixel counter determiner 763*b* (Step S600, see FIGS. 5 and 6). When NO is determined, a command for writing the image data stored in the line buffer 762 to the VRAM 766 is issued to the RAM control unit 765 (Step S601). That is, the image data stored in the line buffer 762 are compressed by the compression unit 764 and written to the VRAM 766. Subsequently, the second front porch process ends and the process proceeds to Step S512 of FIG. 12. Alternatively, when YES is determined in Step S600, the process stands by until it is determined that the present process is the back porch period on the basis of the signal output by the output data conversion unit 768 (Step S602). Then, the second front porch process ends and proceeds to Step S507 of FIG. 12.

In the above-described embodiment, even when the writing line and the reading line are the same, the writing/reading control unit 763 controls the process of writing the compressed data of the same line, which are formed by allowing the compression unit 764 to compress the image data maintained in the buffer line 762, in a pixel unit to the vacant area of a pixel unit generated in the VRAM 766 in response to the process of reading the compressed data of the same line. That is, by determining the period in which the one-line compressed data are written to the VRAM 766 and whether the compressed data are written in a pixel unit to the VRAM 766, it is possible to write newly compressed data in a pixel unit to the vacant area generated in the VRAM 766 without waiting the end of the process of reading the compressed data of the line where the competition between the writing process and the reading process may occur in the VRAM 766. Accordingly, it is possible to effectively write the compressed data to the VRAM 766.

Since "the buffer memory" according to the invention is configured by the line buffer 762 provided in front of the compression unit 764, a practical configuration of "the buffer memory" is able to be realized. Accordingly, it is possible to allow the writing/reading control unit 763 to easily control the processes of writing and reading the image data to and from the line buffer 762.

The invention is not limited to the above-described embodiment, but may be modified in various forms other than the above-described embodiment without departing the gist of the invention. For example, in the above-described embodiment, the image data are temporarily maintained in the line buffer 762 before compressing the image data. However, the image data may be temporarily maintained after compressing the image data. With such a configuration, the same advantage as that in the above-described embodiment is obtained. In addition, in the above-described embodiment, the image data are compressed by the compression unit 764 after storing the image data are usually stored in the line buffer 762. However, a configuration in which the image data or the compressed data are stored in the line buffer may provided of course, only when the processes of writing and reading the compressed data to and from the VRAM 766 compete with each other or there is a possibility that the competition between the reading process and writing process occur.

In the above-described embodiment, the ink cartridge type photo printer 10 is described as an example, but the invention may be applied to printing apparatuses such as other ink jet printers. Moreover, the invention is widely applicable to techniques for displaying an image on a screen display device such as a liquid crystal display, a plasma display, and an organic EL display.

What is claimed is:

1. A screen display control device comprising:

a compression unit which compresses input image data into line units of compressed data;

a rewritable image memory to which line units of compressed data compressed by the compression unit are written in non-synchronization with a reading process;

a decompression unit which decompresses line units of compressed data periodically read from the image memory in synchronization with screen display during the reading process to restore original image data;

a display unit which displays an image of original image data decompressed and restored by the decompression unit;

a buffer memory which temporarily maintains one-line data of input image data; and a writing/reading control unit which controls writing compressed data to the image memory, reading compressed data from the image memory, writing input image data to the buffer memory, and reading input image data from the buffer memory, wherein, when writing a first line unit of compressed data corresponding to a particular line to the image memory competes with reading a second line unit of compressed data corresponding to the same particular line from the image memory, the writing/reading control unit maintains input image data corresponding to the particular line in the buffer memory, and wherein the writing/reading control unit subsequently allows the compression unit to compress the input image data maintained in the buffer memory into compressed image data comprising a plurality of pixel units, and writes each of the plurality of pixel units to a corresponding vacant pixel unit storage area in the image memory, the vacant pixel unit storage area being generated in response to a process of reading the second line unit of compressed data.

2. The screen display control device according to claim 1, wherein the buffer memory is a line buffer memory which is provided in front of the compression unit.

3. A screen display control device comprising:

a compression unit which compresses input image data into line units of compressed data;

a rewritable image memory to which line units of compressed data compressed by the compression unit are written in non-synchronization with a reading process;

a decompression unit which decompresses line units of compressed data periodically read from the image memory in synchronization with screen display during the reading process to restore original image data;

a display unit which displays an image of original image data decompressed and restored by the decompression unit;

a buffer memory which temporarily maintains compressed one-line data compressed by the compression unit; and a writing/reading control unit which controls writing compressed data to the image memory, reading compressed data from the image memory, writing compressed data to the buffer memory, and reading compressed data from the buffer memory, wherein, when writing a first line unit of compressed data corresponding to a particular line to the image memory competes with reading a second line unit of compressed data corresponding to the same particular line from the image memory, the writing/reading control unit maintains the first line unit of compressed data in the buffer memory as a plurality of pixel units, and wherein the writing/reading control unit subsequently writes each of the plurality of pixel units to a corresponding vacant pixel unit storage area in the image memory, the vacant pixel unit storage area being generated in response to a process of reading the second line unit of compressed data.

4. A screen display control device comprising:

a rewritable image memory to which line units of compressed data are written in non -synchronization with a reading process;

a microprocessor that compresses input image data into line units of compressed data and decompresses line units of compressed data periodically read from the image memory in synchronization with screen display during the reading process to restore original image data;

a display which displays an image of original image data decompressed and restored by the microprocessor;

a buffer memory which temporarily maintains one-line data of the input image data; and a write/read controller which controls writing compressed data to the image memory, reading compressed data from the image memory, writing input image data to the buffer memory, and reading input image data from the buffer memory, wherein, when writing a first line unit of compressed data corresponding to a particular line to the image memory competes with reading a second line unit of compressed data corresponding to the same particular line from the image memory, the write/read controller maintains input image data corresponding to the particular line in the buffer memory, and wherein the write/read controller subsequently allows the microprocessor to compress the input image data maintained in the buffer memory into compressed image data comprising a plurality of pixel units, and writes each of the plurality of pixel units to a corresponding vacant pixel unit storage area in the image memory, the vacant pixel unit storage area being generated in response to a process of reading the second line unit of compressed data.

5. The screen display control device according to claim 4, wherein the buffer memory is a line buffer memory which is provided in front of the microprocessor.

* * * * *